United States Patent
Kimura

(10) Patent No.: US 12,090,369 B2
(45) Date of Patent: Sep. 17, 2024

(54) GOLF BALL

(71) Applicant: Bridgestone Sports Co., Ltd., Tokyo (JP)

(72) Inventor: Akira Kimura, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 17/976,321

(22) Filed: Oct. 28, 2022

(65) Prior Publication Data

US 2023/0138800 A1   May 4, 2023

(30) Foreign Application Priority Data

Oct. 29, 2021 (JP) ................................. 2021-177102

(51) Int. Cl.
| | |
|---|---|
| A63B 37/06 | (2006.01) |
| A63B 37/00 | (2006.01) |
| C08K 13/02 | (2006.01) |
| C08L 75/08 | (2006.01) |
| C09D 175/06 | (2006.01) |

(52) U.S. Cl.
CPC ...... *A63B 37/0051* (2013.01); *A63B 37/0063* (2013.01); *A63B 37/0075* (2013.01); *C08K 13/02* (2013.01); *C08L 75/08* (2013.01); *C09D 175/06* (2013.01); *A63B 37/0027* (2013.01)

(58) Field of Classification Search
CPC .................... A63B 37/0063; A63B 37/0023
See application file for complete search history.

(56) References Cited

U.S. PATENT DOCUMENTS

| | | | | |
|---|---|---|---|---|
| 2010/0298070 | A1* | 11/2010 | Higuchi | A63B 37/0012 |
| | | | | 473/384 |
| 2013/0131236 | A1* | 5/2013 | Ozawa | C08K 5/09 |
| | | | | 524/106 |
| 2013/0157143 | A1* | 6/2013 | Hoshiba | H01M 4/621 |
| | | | | 429/211 |
| 2014/0100059 | A1* | 4/2014 | Kimura | A63B 37/0064 |
| | | | | 473/377 |
| 2016/0166887 | A1 | 6/2016 | Nakajima et al. | |
| 2016/0279484 | A1 | 9/2016 | Watanabe et al. | |
| 2016/0354644 | A1 | 12/2016 | Watanabe et al. | |

FOREIGN PATENT DOCUMENTS

| | | |
|---|---|---|
| JP | 2016-112159 A | 6/2016 |
| JP | 2016-179052 A | 10/2016 |
| JP | 2017-000183 A | 1/2017 |

OTHER PUBLICATIONS

Asahi Chemical Data Sheet S.O.E. S1611 (Year: 2020).*

* cited by examiner

*Primary Examiner* — Raeann Gorden
(74) *Attorney, Agent, or Firm* — Sughrue Mion, PLLC

(57) ABSTRACT

In a golf ball for professional golfers and skilled amateurs which has a single-layer core, a cover and at least one intermediate layer therebetween, the core is molded from a rubber composition that includes a base rubber, an unsaturated carboxylic acid and/or metal salt thereof, an organic peroxide and, in a specific weight ratio, water and sulfur, and has a hardness profile which satisfies certain specific conditions. The ball achieves an excellent distance on full shots with a driver (W #1) and a middle iron, and is designed for high controllability in the short game.

7 Claims, 3 Drawing Sheets

GOLF BALL

CROSS-REFERENCE TO RELATED APPLICATION

This non-provisional application claims priority under 35 U.S.C. § 119(a) on Patent Application No. 2021-177102 filed in Japan on Oct. 29, 2021, the entire contents of which are hereby incorporated by reference.

TECHNICAL FIELD

The present invention relates to a golf ball for professional golfers and skilled amateurs which has a construction of three or more pieces that includes a core, a cover, and at least one layer interposed between the core and the cover.

BACKGROUND ART

Multi-piece solid golf balls such as three-piece solid golf balls are commonly used as golf balls for professional golfers and skilled amateurs. Multi-piece solid golf balls generally have a construction in which a core made of a rubber composition is encased by a multi-layer cover composed of various resin materials. The core accounts for most of the golf ball volume and exerts a large influence on ball properties such as rebound, feel at impact and durability. In a number of recent disclosures in the art, the cross-sectional hardness of the core is adjusted to create a specific core hardness gradient, enabling the ball to achieve an increased distance owing to optimization of the spin characteristics on full shots with a driver or iron club.

Methods for adjusting the cross-sectional hardness of the core include suitably adjusting the compounding ingredients in the core-forming rubber composition or the vulcanization temperature and time. For example, JP-A 2016-112159, JP-A 2016-179052 and JP-A 2017-000183 describe specific core interior cross-sectional hardnesses achieved by including water as one of the compounding ingredients in the core-forming rubber composition.

However, the golf balls described in the foregoing patent literature still leave room for improvement in terms of achieving both a good distance on full shots and controllability in the short game.

SUMMARY OF THE INVENTION

It is therefore an object of the present invention to provide a golf ball for professional golfers and skilled amateurs which has an excellent flight performance on full shots with a driver (W#1) and with irons and which also has a good controllability on approach shots.

As a result of intensive investigations, we have found that by focusing on the hardness profile of the core in a golf ball having a single-layer core, a cover and at least one intermediate layer therebetween and using a specific core formulation to achieve the desired profile, both distance and controllability can be achieved at a high level in golf balls for professional golfers and skilled amateurs. Specifically, the object of the invention can be attained by using in the core formulation (a) a base rubber, (b) a co-crosslinking agent which is an α,β-unsaturated carboxylic acid and/or a metal salt thereof and (c) an organic peroxide, by additionally including (d) water and (e) sulfur and specifying the weight ratio between the water and the sulfur, and moreover by specifying, in the core hardness profile, both the relationship between the hardness at a position 70% from the core center and the surface hardness and also the relationship between the average value of the core hardness profile and the hardness at a position 70% from the core center.

The golf ball of the invention is intended for use by professional golfers and skilled amateurs. As used herein, "professional golfers and skilled amateurs" refers to golfers having a high head-speed range of generally from 45 to 57 m/s.

Accordingly, the invention provides a golf ball having a single-layer core, a cover and at least one intermediate layer interposed between the core and the cover, wherein the core is a material molded under heat from a rubber composition which includes (a) a base rubber, (b) a co-crosslinking agent which is an α,β-unsaturated carboxylic acid and/or a metal salt thereof, (c) an organic peroxide, (d) water and (e) sulfur and in which components (d) and (e) have a weight ratio (e)/(d) therebetween that is equal to or more than 0.010; and the core has a hardness profile which satisfies the following conditions:

$$HAV-H70 \geq -4, \text{ and}$$

$$H100-H70 > 10,$$

where H0 is the JIS-C hardness at a center of the core, H50 is the JIS-C hardness at a point 50% from the core center, H70 is the JIS-C hardness at a point 70% from the core center, H100 is the JIS-C hardness at a surface of the core, and HAV is an average cross-sectional hardness obtained as the average of H0, H50 and H100.

In a preferred embodiment of the golf ball of the invention, the ball satisfies the condition $H100-H0 \geq 20$.

In another preferred embodiment of the inventive golf ball, the rubber composition of the core further includes (f) an antioxidant which is a benzimidazole of the following general formula and/or a metal salt thereof

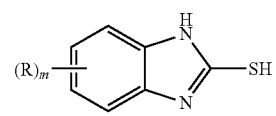

(1)

(wherein R is a hydrogen atom or a hydrocarbon group of 1 to 20 carbon atoms and m is an integer from 1 to 4, with the proviso that if m is 2 or more, each R may be like or unlike). Component (f) may be selected from the group consisting of 2-mercaptobenzimidazole, 2-mercaptomethylbenzimidazole and metal salts thereof.

In yet another preferred embodiment, at least one layer of the cover includes (I) polyurethane or polyurea, (II) a thermoplastic polyester elastomer and (III) an aromatic vinyl elastomer, components (II) and (III) each being included in respective amounts of 20 parts by weight or less per 100 parts by weight of component (I). The thermoplastic polyester elastomer serving as component (II) may have a Shore D hardness of 45 or less, a rebound resilience of 74% or less, and a melt viscosity at 200° C. and a shear rate of 243 s$^{-1}$ of $1.5 \times 10^4$ dPa·s or less. The aromatic vinyl elastomer serving as component (III) may have a Shore D hardness of 30 or less and a rebound resilience of 30% or less.

Advantageous Effects of the Invention

The golf ball of the invention, which is designed for professional golfers and skilled amateurs, enables a superior distance to be achieved owing to the synergistic effects of a reduced spin rate and a high initial velocity on shots in the high head-speed range, and also has a good controllability in the short game and a high durability on repeated impact.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

Figure 1:
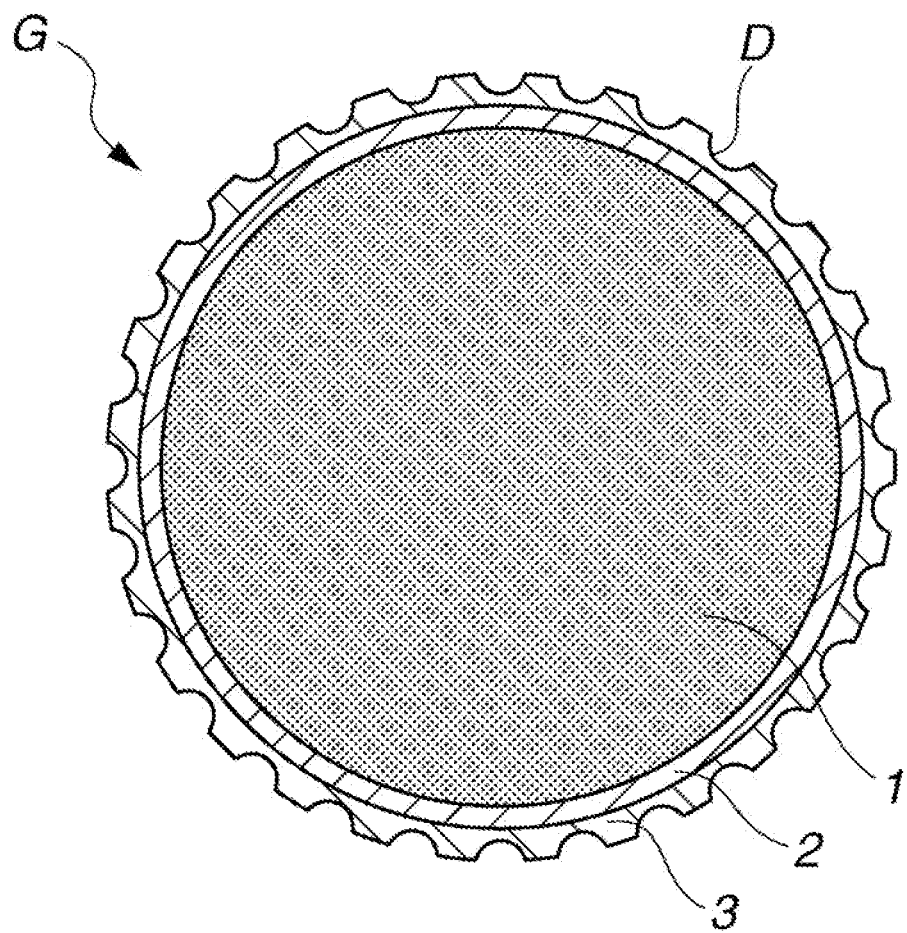
FIG. 1 is a schematic cross-sectional view of the golf ball according to one embodiment of the invention.

The multi-piece solid golf ball of the invention has a single-layer core, an intermediate layer and a cover. FIG. 1 shows an example of the inventive golf ball. The golf ball G shown in FIG. 1 has a single-layer core 1, a single-layer intermediate layer 2 encasing the core 1, and a single-layer cover 3 encasing the intermediate layer 2. The cover 3 is positioned as the outermost layer, excluding a coating layer, in the layered construction of the ball. The intermediate layer may be a single layer as shown in FIG. 1, or may be formed as a plurality of layers. Numerous dimples D are typically formed on the surface of the cover (outermost layer) 3 to enhance the aerodynamic properties of the ball. Although not shown in FIG. 1, a coating layer is generally formed on the surface of the cover 3. The layers are each described in detail below.

The core is made of a material molded under heat from a rubber composition which includes components (a) to (e) below:
(a) a base rubber,
(b) a co-crosslinking agent which is an α,β-unsaturated carboxylic acid and/or a metal salt thereof,
(c) an organic peroxide,
(d) water, and
(e) sulfur.

The base rubber serving as component (a) is not particularly limited, although it is particularly suitable to use a polybutadiene.

It is desirable for the polybutadiene to have, on the polymer chain thereof, a cis-1,4 bond content of 60% or more, preferably 80% or more, more preferably 90% or more, and most preferably 95% or more. When cis-1,4 bonds account for too few of the bonds on the polybutadiene molecule, the resilience may decrease.

The content of 1,2-vinyl bonds on the polybutadiene is generally not more than 2%, preferably not more than 1.7%, and more preferably not more than 1.5%, of the polymer chain. When the content of 1,2-vinyl bonds is too high, the resilience may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The polybutadiene accounts for a proportion of the overall rubber that is preferably 60 wt % or more, more preferably 70 wt % or more, and most preferably 90 wt % or more. The above polybutadiene may account for 100 wt % of the base rubber; that is, it may account for all of the base rubber.

Next, component (b) is a co-crosslinking agent which is an α,β-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

The content of component (b) per 100 parts by weight of the base rubber serving as component (a) is preferably at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. At a content lower than this range, the ball may be too soft and have a poor rebound. At a content higher than this range, the ball may be too hard, resulting in a poor feel on impact, and may also be brittle and thus have a poor durability.

The co-crosslinking agent serving as component (b) has a mean particle size of preferably from 3 to 30 μm, more preferably from 5 to 25 μm, and even more preferably from 8 to 15 μm. At a mean particle size for the co-crosslinking agent that is below 3 μm, the co-crosslinking agent tends to agglomerate within the rubber composition, leading to an increase in reactivity between molecules of acrylic acid and a decrease in reactivity between molecules of the base rubber, as a result of which the golf ball may be unable to achieve a sufficient rebound performance. At a mean particle size for the co-crosslinking agent in excess of 30 μm, the co-crosslinking agent particles become too large, increasing the variability in the properties of the resulting golf balls.

Component (c) is an organic peroxide. It is preferable for this organic peroxide to be one that has a one minute half-life temperature of between 110 and 185° C. Examples of such organic peroxides include dicumyl peroxide (Percumyl D, from NOF Corporation), 2,5-dimethyl-2,5-di(t-butylperoxy) hexane (Perhexa 25B, from NOF Corporation) and di(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly or two or more may be used together.

The content of component (c) per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight.

Component (d) is water. The water serving as component (d) is not particularly limited, and may be distilled water or tap water. The use of distilled water which is free of impurities is especially preferred.

Decomposition of the organic peroxide within the core formulation can be promoted by the direct addition of water or a water-containing material as component (d) to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the vulcanization mold, but the temperature near the core center, due to the build-up of heat of decomposition by the organic peroxide which has decomposed from the outside, becomes considerably higher than the mold temperature. In cases where water or a water-containing material is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

The amount of component (d) included per 100 parts by weight of the base rubber is preferably at least 0.1 part by weight, and more preferably at least 0.5 part by weight. The upper limit is preferably not more than 10 parts by weight, more preferably not more than 5 parts by weight, and even more preferably not more than 3 parts by weight. When too much component (d) is included, the hardness decreases and it may not be possible to obtain the desired feel on impact, durability and rebound. When too little component (d) is included, the desired core hardness profile may not be obtained and it may not be possible to fully achieve a ball spin rate-lowering effect on shots.

Specific examples of the sulfur serving as component (e) include Sanmix S-80N (available under this trade name from Sanshin Chemical Industry Co., Ltd.) and Sulfax-5 (from Tsurumi Chemical Industry Co., Ltd.). The amount of sulfur included per 100 parts by weight of the base rubber must be more than 0 parts by weight, and is preferably at least 0.005 part by weight, and more preferably at least 0.01 part by weight. Although there is no upper limit on the amount included, the amount is preferably set to not more than 0.1 part by weight, more preferably not more than 0.05 part by weight, and even more preferably not more than 0.03 part by weight. Adding sulfur makes it possible to increase hardness differences in the core. However, when too much sulfur is added, the rebound may undergo a large decrease or the durability on repeated impact may decrease.

The ratio in which components (d) and (e) are included, expressed as the weight ratio (e)/(d) must be at least 0.010 and is preferably at least 0.020, more preferably at least 0.030, and even more preferably at least 0.040. The upper limit is preferably not more than 0.450, more preferably not more than 0.350, and even more preferably not more than 0.250. Outside of this numerical range, it may be difficult to achieve the intended core hardness profile and it may be impossible to achieve both a superior distance on high head-speed shots with a driver (W#1) and a good durability to repeated impact. It should be noted that the amount of component (e) refers not to the weight of the sulfur product itself, but to the weight of the sulfur constituent included within the product.

In addition, it is desirable for the rubber composition to include also (f) an antioxidant which is a benzimidazole of the following general formula and/or a metal salt thereof.

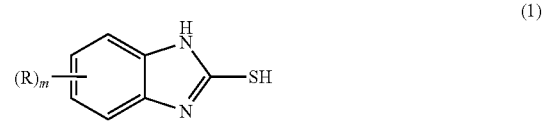

(1)

In formula (1), R is a hydrogen atom or a hydrocarbon group of 1 to 20 carbon atoms and m is an integer from 1 to 4; when m is 2 or more, each R may be like or unlike. Specific examples of the benzimidazole of formula (1) include 2-mercaptobenzoimidazole, 2-mercaptomethylbenzoimidazole, and metal salts of these. The metal salts are preferably zinc salts.

The amount of benzimidazole of the above specific formula and/or metal salt thereof included as component (f) per 100 parts by weight of the base rubber is preferably at least 0.1 part by weight, and more preferably at least 0.3 part by weight. The upper limit is preferably not more than 5 parts by weight, and more preferably not more than 3 parts by weight. When the component (f) content is too small, crosslinking reactions near the core surface may not proceed efficiently, as a result of which the crosslink density may not become high enough and a layer having a high hardness may not fully form. Also, with regard to the overall core, the hardness difference between the core surface and the core center may not become large enough, in addition to which the ball may lack sufficient durability on impact. On the other hand, when an excessive amount of component (f) is included, the advantageous effects are no better than those obtained with the above-indicated preferred amount of addition.

Aside from above components (a) to (e) and optional component (f), various additives such as fillers, organosulfur compounds and processing aids may be included, provided that doing so is not detrimental to the objects of the invention.

Examples of fillers that may be suitably used include zinc oxide, barium sulfate and calcium carbonate. These may be used singly or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

The organosulfur compounds are not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides, dithiobenzoylpolysulfides and 2-thionaphthols. These may be used singly or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a rubber vulcanizate that has too low a hardness. On the other hand, including too little may make a rebound-improving effect unlikely.

Processing aids that may be suitably used include higher fatty acids and metal salts thereof. Examples of higher fatty acids include stearic acid, palmitic acid, oleic acid, linoleic acid, linolenic acid and myristic acid. Stearic acid is especially preferred. Examples of higher fatty acid metal salts include lithium salts, sodium salts, potassium salts, copper salts, magnesium salts, calcium salts, strontium salts, barium salts, tin salts, cobalt salts, nickel salts, zinc salts and aluminum salts. The use of zinc stearate is especially preferred. The amount of processing aid included per 100 parts by weight of the base rubber may be set to preferably at least 1 part by weight, more preferably at least 3 parts by weight, and even more preferably at least 5 parts by weight. The upper limit in the amount of addition per 100 parts by weight of the base rubber may be set to preferably not more than parts by weight, more preferably not more than 15 parts by weight, and even more preferably not more than 10 parts by weight. When too much is added, a sufficient hardness and rebound may not be obtained; when too little is added, the chemicals that are added may not fully disperse and it may not be possible to obtain the expected properties. Examples of methods that may be used to add the processing aid include, but are not particularly limited to: charging the processing aid into a mixer at the same time as other chemicals, adding the processing aid after first mixing it together with other chemicals such as component (b), adding the processing aid after coating it onto the surface of other chemicals such as component (b), and adding the processing aid after first preparing a masterbatch of it together with component (a).

An antioxidant differing from component (f) may be included. Specific examples of this antioxidant include hindered phenol-type antioxidants such as 2,6-di-tert-butyl-4-methylphenol, 2,6-di-tert-butyl-4-ethylphenol, pentaerythritol tetrakis[3-(3,5-di-tert-butyl-4-hydroxyphenyl) propionate] and 1,3,5-tris(3',5'-di-t-butyl-4-hydroxybenzyl) isocyanuric acid. Commercial products that can be used include Nocrac 200, Nocrac M-17 (both from Ouchi Shinko Chemical Industry Co., Ltd.), Irganox 1010 (from BASF) and ADK Stab AO-20 (from Adeka). These may be used singly or two or more may be used together. The amount of this antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When too much or too little is included, a proper core hardness gradient may not be obtained, as a result of which it may not be possible to achieve a good rebound, a good durability and a good spin rate-lowering effect on full shots.

A vulcanizate (the core) can be produced by vulcanizing/curing the above rubber composition. Specifically, the core which is a vulcanizate can be produced by using a mixing apparatus such as a Banbury mixer or a roll mill to knead the rubber composition, using a core mold to compression mold or injection mold the kneaded composition, and then curing the molded body by suitably heating it under conditions sufficient to allow the organic peroxide or co-crosslinking agent to act, such as at a temperature of between 100 and 200° C. for 10 to 40 minutes.

The molded rubber material obtained after molding the above composition under applied heat, i.e., the core in this invention, has a specific internal hardness profile. This specific core hardness profile, together with the layered structure of the subsequently described intermediate layer and cover, enables an excellent distance performance to be attained on full shots with a driver (W #1) and an iron, thus making it possible to achieve high levels of both flight and controllability as a golf ball for professional golfers and skilled amateurs.

In this invention, the core is formed as a single layer. In the case of a multi-layer rubber core, separation at the interface may arise with repeated impact, worsening the durability.

The core has a diameter which, although not particularly limited, is preferably at least 35.5 mm, more preferably at least 37.5 mm, and even more preferably at least 38.0 mm. The core diameter is preferably not more than 39.5 mm, more preferably not more than 39.2 mm, and even more preferably not more than 38.8 mm. When the core diameter is too small, the initial velocity on full shots may decrease, resulting in a poor distance, or the feel at impact may worsen. On the other hand, when the core diameter is too large, the durability to cracking on repeated impact may decrease.

The core has a deflection when compressed under a final load of 1,275 N (130 kgf) from an initial load of 98 N (10 kgf) which, although not particularly limited, is preferably at least 2.5 mm, more preferably at least 2.7 mm, and even more preferably at least 2.9 mm. The upper limit is preferably not more than 5.0 mm, and more preferably not more than 4.5 mm. When the core deflection is too small, i.e., when the core is too hard, the spin rate of the ball may rise excessively and so the intended distance may not be achieved, or the feel at impact may become too hard. On the other hand, when the core deflection is too large, i.e., when the core is too soft, the initial velocity of the ball on shots may decrease and the intended distance may not be achieved, the feel at impact may become too soft, or the durability of the ball to cracking on repeated impact may worsen.

In this invention, letting the JIS-C hardness at the center of the core be H0, the JIS-C hardness at a point 50% from the core center be H50, the JIS-C hardness at a point 70% from the core center be H70, the JIS-C hardness at the surface of the core be H100 and the average of H0, H50 and H100 be the average cross-sectional hardness HAV, the core is characterized by having a hardness profile which satisfies the following conditions:

$$HAV-H70 \geq -4, \text{ and}$$

$$H100-H70>10.$$

When this relationship is not satisfied, the spin rate on full shots may rise, the initial velocity may fall, or the ball may be readily affected by wind as a result of which the intended distance may not be attained.

The JIS-C hardness at the core center (H0), although not particularly limited, is preferably at least 40, more preferably at least 45, and even more preferably at least 50, and is preferably not more than 75, more preferably not more than 70, and even more preferably not more than 65. At a value outside of these hardnesses, the feel of the ball may become harder or the spin rate on full shots may rise and the intended distance may not be obtained.

The JIS-C hardness at a point 50% from the center of the core (H50), although not particularly limited, is preferably at least 50, more preferably at least 55, and even more preferably at least 60, and is preferably not more than 85, more preferably not more than 80, and even more preferably not more than 75. At a value outside of these hardnesses, the spin rate on full shots may rise, the initial velocity of the ball when hit may decrease or the flight of the ball may be more readily affected by the wind, as result of which the intended distance may not be attained.

The JIS-C hardness at a point 70% from the center of the core (H70), although not particularly limited, is preferably at least 55, more preferably at least 60, and even more preferably at least 65, and is preferably not more than 85, more preferably not more than 82, and even more preferably not more than 79. A value outside of these hardnesses may lead to disadvantageous results similar to those described above for the JIS-C hardness at a point 50% from the core center (H50).

The JIS-C hardness at the surface of the core (H100), although not particularly limited, is preferably at least 70, more preferably at least 75, and even more preferably at least 80, and is preferably not more than 96, more preferably not more than 94, and even more preferably not more than 92. When this value is too small, the rebound may decrease and the flight performance may worsen, or the durability to cracking on repeated impact may worsen.

It is essential for the value of (HAV–H70) in the above formula to be equal to or more than −4. The technical meaning here is that the average value of the core cross-sectional hardness and the value of the hardness at a point 70% from the core center become relatively close. HAV–H70 has a value that is preferably equal to −3 or more, and more preferably equal to −2 or more, and is preferably not more than +4, more preferably not more than +3, and even more preferably not more than +2. When this value is too small, the spin rate on full shots rises and a good distance is not obtained.

It is also essential for the value of (H100–H70) in the above formula to be equal to or more than 10. The technical meaning here is that, in the core hardness profile near the surface of the core, the hardness gradient from the hardness at a point 70% from the core center to the core surface is relatively large, being preferably 11 or more, and more preferably 12 or more. However, this value is preferably not more than 25, more preferably not more than 22, and even more preferably not more than 20. Outside of this range, the spin rate on full shots may rise and a good distance may not be attained, or the durability to cracking on repeated impact may worsen.

Also, in the hardness profile of the core used in this invention, it is desirable to specify the hardness difference between the surface and center of the core. That is, the hardness difference between the surface and center of the core, expressed as the value (H100–H0), is preferably at least 18, more preferably at least 20, and even more preferably at least 22, but is preferably not more than 43, and more preferably not more than 40. When this value is too large, the durability to cracking on repeated impact may worsen. On the other hand, when this value is too small, the spin rate on full shots may increase and a good distance may not be attained.

Next, the intermediate layer is described. The intermediate layer is formed as a single layer or as a plurality of layers. As explained below, it is preferable for each such layer to be formed of a resin material.

The intermediate layer has a material hardness on the Shore D hardness scale which, although not particularly limited, is preferably at least 60, more preferably at least 62, and even more preferably at least 64. The upper limit is preferably not more than 72, more preferably not more than 70, and even more preferably not more than 68. The surface hardness of the sphere obtained by encasing the core with the intermediate layer (intermediate layer-encased sphere), expressed on the Shore D hardness scale, is preferably at least 66, more preferably at least 68, and even more preferably at least 70. The upper limit is preferably not more than 78, more preferably not more than 76, and even more preferably not more than 74. When the intermediate layer material hardness and surface hardness are lower than the above ranges, the spin rate on full shots may rise excessively and a good distance may not be achieved, or the initial velocity of the ball may be low, as a result of which a good distance may not be achieved on full shots. On the other hand, when the material hardness and surface hardness are too high, the durability to cracking on repeated impact may worsen or the feel at impact may worsen.

The intermediate layer has a thickness which is preferably at least 0.90 mm, more preferably at least 1.10 mm, and even more preferably at least 1.15 mm. The upper limit is preferably not more than 1.80 mm, more preferably not more than 1.70 mm, and even more preferably not more than 1.50 mm. When the intermediate layer is too thin, the durability to cracking on repeated impact may worsen, or the spin rate on full shots with an iron may rise and a good distance may not be achieved. On the other hand, when the intermediate layer is too thick, the initial velocity on shots may decrease and the intended distance may not be achieved, or the feel at impact may worsen.

Various thermoplastic resins used as golf ball materials, particularly resin materials composed primarily of an ionomer resin, may be employed as the intermediate layer material.

The ionomer resin material may also include a high-acid ionomer. For example, the ionomer resin material used may be one obtained by blending, of commercially available ionomer resins, a high-acid ionomer resin having an acid content of at least 16 wt % with an ordinary ionomer resin. With such a blend, a lower spin rate and a higher rebound are both achieved on full shots with a driver (W#1), enabling the intended distance to be attained.

The amount of unsaturated carboxylic acid included in the high-acid ionomer resin, i.e., the acid content, is generally at least 16 wt %, preferably at least 17 wt %, and more preferably at least 18 wt %. The upper limit is preferably not more than 22 wt %, more preferably not more than 21 wt %, and even more preferably not more than 20 wt %. When this value is too small, the spin rate on full shots with a driver (W#1), a utility club or an iron may rise, as a result of which the intended distance may not be attainable. On the other hand, when this value is too large, the feel at impact may become too hard or the durability to cracking on repeated impact may worsen.

The amount of high-acid ionomer resin included per 100 wt % of the resin material is preferably at least 20 wt %, more preferably at least 50 wt %, and even more preferably at least 60 wt %. The upper limit is 100 wt % or less, preferably 90 wt % or less, and more preferably 85 wt % or less. When the amount of the above high-acid ionomer resin included is too low, the spin rate on full shots may rise and a good distance may not be achieved. On the other hand, when the amount of high-acid ionomer resin included is too high, the durability to repeated impact may worsen.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than parts by weight, and more preferably not more than 4 parts by weight.

It is desirable to abrade the surface of the intermediate layer in order to increase adhesion of the intermediate layer material with the polyurethane that is used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is generally less than 1.1, preferably from 0.90 to 1.05, and more preferably from 0.93 to 0.99. Outside of this range, the rebound of the overall ball may decrease and a good distance may not be achieved, or the durability to cracking on repeated impact may worsen.

Next, the cover, which serves as the outermost layer, is described.

The cover has a material hardness on the Shore D hardness scale which, although not particularly limited, is preferably at least 35, more preferably at least 40, and even more preferably at least 43. The upper limit is preferably not more than 60, more preferably not more than 55, and even more preferably not more than 50. The surface hardness of the sphere obtained by encasing the intermediate layer-encased sphere with the cover (i.e., the ball surface hardness), expressed on the Shore D hardness scale, is preferably at least 50, more preferably at least 53, and even more preferably at least 56. The upper limit is preferably not more than 70, more preferably not more than 67, and even more preferably not more than 64. When the material hardness of the cover and the ball surface hardness are lower than the respective above ranges, the spin rate of the ball on full shots may rise and a good distance may not be achieved under any hitting conditions. On the other hand, when the material hardness of the cover and the ball surface hardness are higher than the above ranges, the ball may not be sufficiently receptive to spin on approach shots or the scuff resistance may worsen.

The cover has a thickness of preferably at least 0.3 mm, more preferably at least 0.45 mm, and even preferably at least 0.6 mm. The upper limit in the cover thickness is preferably not more than 1.2 mm, more preferably not more than 1.15 mm, and even more preferably not more than 1.0 mm. When the cover is too thick, the rebound on full shots with an iron may be inadequate or the spin rate may rise, as a result of which a good distance may not be achieved. On the other hand, when the cover is too thin, the scuff resistance may worsen or the ball may not be fully receptive to spin on approach shots and may thus lack sufficient controllability.

The combined thickness of the cover and the intermediate layer is preferably at least 1.4 mm, more preferably at least 1.7 mm, and even more preferably at least 2.0 mm. The upper limit of this combined thickness is preferably not more than 2.8 mm, more preferably not more than 2.7 mm, and even more preferably not more than 2.5 mm. When the combined thickness is too small, the durability of the ball to cracking on repeated impact may worsen. On the other hand, when the combined thickness is too large, the spin rate on full shots may rise and a good distance may not be achieved.

Various types of thermoplastic resins used in golf ball cover stock may be employed as the cover material. For reasons having to do with the spin controllability of the ball in the short game and the scuff resistance, the use of a resin material composed largely of (I) the polyurethane or polyurea described below is preferred.

(I) Polyurethane or Polyurea

Polyurethane or polyurea may be used as the base resin of the above cover material (resin composition). The polyurethane (I-a) and polyurea (I-b) which may be used as this component are described in detail below.

(I-a) Polyurethane

The polyurethane has a structure which includes soft segments composed of a polymeric polyol (polymeric glycol) that is a long-chain polyol, and hard segments composed of a chain extender and a polyisocyanate. Here, the polymeric polyol serving as a starting material may be any that has hitherto been used in the art relating to polyurethane materials, and is not particularly limited. It is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include poly(ethylene glycol), poly(propylene glycol), poly(tetramethylene glycol) and poly(methyltetramethylene glycol). These polyols may be used singly or two or more may be used in combination.

It is preferable to use a polyether polyol as the polymeric polyol.

The long-chain polyol has a number-average molecular weight that is preferably in the range of 1,000 to 5,000. By using a long-chain polyol having a number-average molecular weight in this range, golf balls made with a polyurethane composition that have excellent properties, including a good rebound and good productivity, can be reliably obtained. The number-average molecular weight of the long-chain polyol is more preferably in the range of 1,500 to 4,000, and even more preferably in the range of 1,700 to 3,500.

Here and below, "number-average molecular weight" refers to the number-average molecular weight calculated based on the hydroxyl value measured in accordance with JIS-K1557.

The chain extender is not particularly limited; any chain extender that has hitherto been employed in the art relating to polyurethanes may be suitably used. In this invention, low-molecular-weight compounds with a molecular weight of 2,000 or less and having on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred.

Any polyisocyanate hitherto employed in the art relating to polyurethanes may be suitably used without particular limitation as the polyisocyanate. For example, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, crosslinking reactions during injection molding may be difficult to control.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method of preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

It is preferable to use a thermoplastic polyurethane material as the polyurethane, with an ether-based thermoplastic polyurethane material being especially preferred. The thermoplastic polyurethane material used may be a commercial product, illustrative examples of which include those available under the trade name Pandex® from DIC Covestro Polymer, Ltd., and those available under the trade name Resamine from Dainichiseika Color & Chemicals Mfg. Co., Ltd.

(I-b) Polyurea

The polyurea is a resin composition composed primarily of urea linkages formed by reacting (i) an isocyanate with (ii) an amine-terminated compound. This resin composition is described in detail below.

(i) Isocyanate

The isocyanate is not particularly limited. Any isocyanate used in the art relating to polyurethanes may be suitably used here. Use may be made of isocyanates similar to those mentioned above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

The long-chain polyamine is an amine compound which has on the molecule at least two amino groups capable of reacting with isocyanate groups and which has a number-average molecular weight of from 1,000 to 5,000. In this invention, the number-average molecular weight is more preferably from 1,500 to 4,000, and even more preferably from 1,900 to 3,000. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly or two or more may be used in combination.

The amine curing agent is an amine compound which has on the molecule at least two amino groups capable of reacting with isocyanate groups and which has a number-average molecular weight of less than 1,000. In this invention, the number-average molecular weight is more preferably less than 800, and even more preferably less than 600. Specific examples of such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino) cyclohexane, derivatives of 4,4'-bis(sec-butylamino) dicyclohexylmethane, 4,4'-dicyclohexylmethanediamine, 1,4-cyclohexane-bis(methylamine), 1,3-cyclohexane-bis (methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis (2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino)diphenylmethane and derivatives thereof, 1,4-bis(sec-butylamino)benzene, 1,2-bis(sec-butylamino) benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or two or more may be used in combination.

(iii) Polyol

Although not an essential ingredient, in addition to above components (i) and (ii), a polyol may also be included in the polyurea. The polyol is not particularly limited, but is preferably one that has hitherto been used in the art relating to polyurethanes. Specific examples include the long-chain polyols and/or polyol curing agents mentioned below.

The long-chain polyol may be any that has hitherto been used in the art relating to polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or two or more may be used in combination.

The long-chain polyol has a number-average molecular weight of preferably from 1,000 to 5,000, and more preferably from 1,700 to 3,500. In this number-average molecular weight range, an even better resilience and productivity are obtained.

The polyol curing agent is preferably one that has hitherto been used in the art relating to polyurethanes, but is not subject to any particular limitation. In this invention, use may be made of a low-molecular-weight compound having on the molecule at least two active hydrogen atoms capable of reacting with isocyanate groups and having a molecular weight of less than 1,000. Of these, the use of aliphatic diols having from 2 to 12 carbon atoms is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

Component (I) has a material hardness on the Shore D hardness scale which, from the standpoint of the spin properties and scuff resistance of the golf ball, is preferably not more than 52, more preferably not more than 50, and even more preferably not more than 48. From the standpoint of the moldability, the lower limit in the material hardness on the Shore D scale is preferably at least 38, and more preferably at least 40.

Component (I) has a rebound resilience which, from the standpoint of enhancing the spin rate on approach shots, is preferably at least 55%, more preferably at least 57%, and even more preferably at least 59%. The rebound resilience is measured in accordance with JIS-K 6255: 2013.

Component (I) serves as the base resin of the resin composition. In order to fully impart the scuff resistance of the urethane resin, it accounts for at least 50 wt %, preferably at least 60 wt %, more preferably at least 70 wt %, even more preferably at least 80 wt %, and most preferably at least 90 wt %, of the resin composition.

When using a resin material composed largely of (I) polyurethane or polyurea, it is suitable to additionally include (II) a thermoplastic polyester elastomer and (III) an aromatic vinyl elastomer. These ingredients are described below.

(II) Thermoplastic Polyester Elastomer

The thermoplastic polyester elastomer (II) is a component which imparts at least a given level of resilience to the resin composition and, along with imparting such resilience, enables the ball to maintain a spin rate at or above a given level on approach shots. The thermoplastic polyester elastomer serving as component (II) has a good compatibility with above component (I) serving as the base resin, the compatibility being better than that of, in particular, hitherto used thermoplastic polyester elastomers, and so is able to confer the ball with a good scuff resistance. In addition, including the thermoplastic polyester elastomer as an essential ingredient in the resin composition provides at least a given level of melt viscosity, imparting the resin composition with hardenability after it has been molded. That is, the thermoplastic polyester elastomer suppresses a decline in the viscosity of the overall resin composition due to the softness of component (I) serving as the base resin, thus preventing a decrease in moldability (productivity) and an increase in appearance defects in the molded golf balls and also holding down a rise in production costs owing to an increased cooling time.

The thermoplastic polyester elastomer serving as component (II) is a resin composition made up of (II-a) a polyester block copolymer and (II-b) a rigid resin. Component (II-a) is made up of, in turn, (II-a1) a high-melting crystalline polymer segment and (II-a2) a low-melting polymer segment.

The high-melting crystalline polymer segment (II-a1) within the polyester block copolymer serving as component (II-a) is a polyester made of one or more compound selected from the group consisting of aromatic dicarboxylic acids and ester-forming derivatives thereof and diols and ester-forming derivatives thereof.

Specific examples of the aromatic dicarboxylic acids include terephthalic acid, isophthalic acid, phthalic acid, 2,6-naphthalenedicarboxylic acid, 2,7-naphthalenedicarboxylic acid, anthracenedicarboxylic acid, diphenyl-4,4'-dicarboxylic acid, diphenoxyethanedicarboxylic acid, 4,4'-diphenyletherdicarboxylic acid, 5-sulfoisophthalic acid and sodium 3-sulfoisophthalate. In this invention, an aromatic dicarboxylic acid is primarily used. However, where necessary, some of this aromatic dicarboxylic acid may be replaced with an alicyclic dicarboxylic acid such as 1,4-cyclohexanedicarboxylic acid, cyclopentanedicarboxylic acid or 4,4'-dicyclohexyldicarboxylic acid or with an aliphatic dicarboxylic acid such as adipic acid, succinic acid, oxalic acid, sebacic acid, dodecanedioic acid or dimer acid. Exemplary ester-forming derivatives of dicarboxylic acids include lower alkyl esters, aryl esters, carboxylic acid esters and acid halides of the above dicarboxylic acids.

Next, a diol having a molecular weight of 400 or less may be suitably used as the diol. Specific examples include aliphatic diols such as 1,4-butanediol, ethylene glycol, trimethylene glycol, pentamethylene glycol, hexamethylene glycol, neopentyl glycol and decamethylene glycol; alicyclic diols such as 1,1-cyclohexanedimethanol, 1,4-dicyclohexanedimethanol and tricyclodecanedimethanol; and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl] sulfone, 1,1-bis[4-(2-hydroxyethoxy)phenyl]cyclohexane, 4,4'-dihydroxy-p-terphenyl and 4,4'-dihydroxy-p-quaterphenyl. Exemplary ester-forming derivatives of diols include acetylated forms and alkali metal salts of the above diols.

These aromatic dicarboxylic acids, diols and derivatives thereof may be used singly or two or more may be used together.

In particular, the following may be suitably used as component (II-a1): high-melting crystalline polymer segments composed of polybutylene terephthalate units derived from terephthalic acid and/or dimethyl terephthalate together with 1,4-butanediol; high-melting crystalline polymer segments composed of polybutylene terephthalate units derived from isophthalic acid and/or dimethyl isophthalate together with 1,4-butanediol; and copolymers of both.

The low-melting polymer segment serving as component (II-a2) is an aliphatic polyether and/or an aliphatic polyester.

Examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycol, and copolymer glycols of ethylene oxide and tetrahydrofuran. Examples of aliphatic polyesters include poly(ε-caprolactone), polyenantholactone, polycaprolactone, polybutylene adipate and polyethylene adipate. In this invention, from the standpoint of the elastic properties, suitable use can be made of poly(tetramethylene oxide) glycol, ethylene oxide adducts of poly(propylene oxide) glycol, copolymer glycols of ethylene oxide and tetrahydrofuran, poly(ε-caprolactone), polybutylene adipate and polyethylene adipate. Of these, the use of, in particular, poly(tetramethylene oxide) glycol, ethylene oxide adducts of poly(propylene oxide) glycol and copolymer glycols of ethylene oxide and tetrahydrofuran is recommended. The number-average molecular weight of these segments in the copolymerized state is preferably from about 300 to about 6,000.

Component (II-a) can be produced by a known method. Specifically, use can be made of, for example, the method of carrying out a transesterification reaction on a lower alcohol diester of a dicarboxylic acid, an excess amount of a low-molecular-weight glycol and a low-melting polymer segment component in the presence of a catalyst and polycondensing the resulting reaction product, or the method of carrying out an esterification reaction on a dicarboxylic acid, an excess amount of glycol and a low-melting polymer segment component in the presence of a catalyst and polycondensing the resulting reaction product.

The proportion of component (II-a) accounted for by component (II-a2) is from 30 to 60 wt %. The preferred lower limit in this case can be set to 35 wt % or more, and the preferred upper limit can be set to 55 wt % or less. When the proportion of component (II-a2) is too low, the impact resistance (especially at low temperatures) and the compatibility may be inadequate. On the other hand, when the proportion of component (II-a2) is too high, the rigidity of the resin composition (and the molded body) may be inadequate.

The rigid resin serving as component (II-b) is not particularly limited. For example, one or more selected from the group consisting of polycarbonates, acrylic resins, styrene resins such as ABS resins and polystyrenes, polyester resins, polyamide resins, polyvinyl chlorides and modified polyphenylene ethers may be used. In this invention, from the standpoint of compatibility, a polyester resin may be preferably used. More preferably, the use of polybutylene terephthalate and/or polybutylene naphthalate is recommended.

Component (II-a) and component (II-b) are blended in a weight ratio, expressed as (II-a):(II-b), which is not particularly limited, although this ratio is preferably set to from 50:50 to 90:10, and more preferably from 55:45 to 80:20. When the proportion of component (II-a) is too low, the low-temperature impact resistance may be inadequate. On the other hand, when the proportion of (II-a) is too high, the rigidity of the composition (and the molded body), as well as the molding processability, may be inadequate.

A commercial product may be used as the thermoplastic polyester elastomer (II). Specific examples include those available as Hytrel® from DuPont-Toray Co. Ltd.

Component (II) has a material hardness on the Shore D hardness scale which, to enhance the spin rate on approach shots, is preferably 45 or less, more preferably 43 or less, and even more preferably 41 or less. The lower limit is a Shore D hardness of preferably at least 36, and more preferably at least 38.

Component (II) has a rebound resilience which, to lower the initial velocity on approach shots, is preferably not more than 74%, more preferably not more than 73%, and even more preferably not more than 72%. The lower limit of this rebound resilience is preferably at least 50%, more preferably at least 52%, and even more preferably at least 60%. The rebound resilience is measured in accordance with JIS-K 6255: 2013.

The thermoplastic polyester elastomer serving as component (II) has a melt viscosity of not more than $1.5 \times 10^4$ dPa·s, preferably not more than $1.45 \times 10^4$ dPa·s, more preferably not more than $1.0 \times 10^4$ dPa·s, and even more preferably not more than $0.8 \times 10^4$ dPa·s. The lower limit is preferably at least $0.4 \times 10^4$ dPa·s, and more preferably at least $0.5 \times 10^4$ dPa·s. With this melt viscosity, hardenability after molding of the resin composition is imparted and a good moldability (productivity) can be maintained. This melt viscosity is a value measured with a Capilograph (a type of capillary rheometer) at a temperature of 200° C. and a shear rate of 243 sec$^{-1}$ in accordance with ISO 11443:1995.

The amount of component (II) included per 100 parts by weight of component (I) is not more than 20 parts by weight, and preferably not more than 15 parts by weight. At above this value, a decrease in the scuff resistance may occur. The lower limit in the amount of component (II) included per 100 parts by weight of component (I) is preferably at least 3 parts by weight, and more preferably at least 5 parts by weight.

(III) Aromatic Vinyl Elastomer

Next, the aromatic vinyl elastomer (III) is described.

By using (III) an aromatic vinyl elastomer together with above-described component (II), a higher spin rate on approach shots can be obtained than in prior-art golf balls, enabling the controllability to be sufficiently increased. Also, by including the aromatic vinyl elastomer (III) in, as subsequently described, a small amount at or below a given level, the compatibility with above component (I) serving as the base resin is good, the compatibility with the above-described thermoplastic polyester elastomer serving as component (II) is good, and a good scuff resistance and moldability can be maintained in the golf ball and the method of manufacture thereof.

The aromatic vinyl elastomer is a polymer (elastomer) composed of polymer blocks made up primarily of an aromatic vinyl compound, and random copolymer blocks made up of an aromatic vinyl compound and a conjugated diene compound. That is, the aromatic vinyl elastomer generally has, as exemplified by SEBS, blocks made up of an aromatic vinyl compound component that are located at both ends of the polymer and serve as hard segments, and intermediate blocks made up of a conjugated diene compound component that are located between the ends and serve as soft segments. Polymers in which an aromatic vinyl-based component has been randomly introduced into the conjugated diene compound component that makes up the intermediate blocks have also been reported in recent research. The hardness of the aromatic vinyl elastomer generally becomes lower as the content of the aromatic vinyl that forms the hard segments decreases; at the same time, because the amount of the soft segment component increases, the rebound resilience rises. On the other hand, in cases where an aromatic vinyl component is randomly introduced into the soft segments serving as the intermediate blocks, the rebound resilience decreases with little if any rise in the hardness. A similar effect can be obtained by using a conjugated diene compound having a high glass transition temperature (Tg) in place of the aromatic vinyl compound that is randomly introduced into the intermediate blocks. In the present invention, to fully exhibit the working effects described above, it is particularly desirable to use the above polymer (elastomer) in a hydrogenated form as component (III).

Examples of the aromatic vinyl compound in the polymer include styrene, α-methylstyrene, p-methylstyrene, divinylbenzene, 1,1-diphenylethylene, N,N-dimethyl-p-aminoethylstyrene and N,N-diethyl-p-aminoethylstyrene. These may be used singly or two or more may be used together. Of these aromatic vinyl compounds, styrene is preferred.

Examples of the conjugated diene compound in the polymer include butadiene, isoprene, 2,3-dimethyl-1,3-butadiene, 1,3-pentadiene, 2-methyl-1,3-pentadiene and 1,3-hexadiene. These may be used singly or two or more may be used together. Of these compounds, butadiene and isoprene are preferred. Butadiene is more preferred.

Units originating from the above conjugated diene compounds, such as units originating from butadiene, become ethylene units or butylene units when subjected to hydrogenation. For example, when a styrene-butadiene-styrene block copolymer (SBS) is hydrogenated, it becomes a styrene-ethylene/butylene-styrene block copolymer (SEBS).

As mentioned above, it is preferable for the aromatic vinyl elastomer used as component (III) to be one that has been hydrogenated; i.e., a hydrogenated aromatic vinyl elastomer. The hydrogenated aromatic vinyl elastomer is preferably an elastomer obtained by hydrogenating a polymer composed of polymer blocks made up primarily of an aromatic vinyl compound and random copolymer blocks made up of an aromatic vinyl compound and a conjugated diene compound; and more preferably an elastomer obtained by hydrogenating a polymer composed of polymer blocks made up primarily of styrene and random copolymer blocks made up of styrene and butadiene. An elastomer obtained by hydrogenating a polymer composed of polymer blocks made up primarily of styrene and random copolymer blocks made up of styrene and butadiene, particularly a polymer having at both ends a polymer block made up primarily of styrene (especially one having at each of the two ends a polymer block consisting entirely of styrene) and having random copolymer blocks in between, is especially preferred. It is thought that a lower hardness and a lower resilience are both achieved by using a copolymer having this structure. In addition, the rate of solidification after molding is rapid and so the degree of tack is low. Also, the compatibility with (I) the polyurethane or polyurea serving as the base resin is excellent, enabling decreases in the physical properties owing to such blending to be held to a minimum.

Illustrative examples of the hydrogenated aromatic vinyl elastomer include styrene-ethylene/butylene-styrene block copolymers (SEBS), styrene-isobutylene-styrene block copolymers (SIBS), styrene-isoprene-styrene block copolymers (SIS), styrene-isobutylene block copolymers (SIB), styrene-ethylene/propylene-styrene block copolymers (SEPS), styrene-ethylene/ethylene/propylene-styrene block copolymers (SEEPS), styrene-butadiene/butylene-styrene block copolymers (SBBS) and styrene-ethylene-propylene block copolymers (SEP).

In the aromatic vinyl elastomer, the proportion of the copolymer accounted for by units originating from the aromatic vinyl compound (i.e., the aromatic vinyl compound content, preferably the styrene content) is preferably at least 30 wt %, more preferably at least 40 wt %, even more preferably at least 50 wt %, and most preferably at least 60 wt %. By thus setting the aromatic vinyl compound content, preferably the styrene content, to a high level, the compatibility with the polyurethane or polyurea serving as component (I) is good and, moreover, the desired hardness and moldability can be prevented from worsening. The content of units from the above aromatic vinyl compound (preferably the styrene content) can be determined by calculation from $H^1$-NMR measurements.

In the aromatic vinyl elastomer, the glass transition temperature (Tg), as indicated by the tan δ peak temperature obtained by dynamic viscoelasticity measurement with a dynamic mechanical analyzer (DMA), is preferably between −20° C. and 50° C., more preferably at least 0° C., and even more preferably at least 5° C. The thinking here is that, by having the tan δ peak temperature be close to the temperature at which the golf ball is normally used, the rebound resilience of the overall resin composition is kept low in the temperature region at which the golf ball is normally used, enabling the desired effects of the invention to be increased.

A commercial product may be used as the aromatic vinyl elastomer serving as component (III). Examples of such commercial products include those available under the trade names S.O.E., Tuftec™ and Tufprene™ from Asahi Kasei Corporation, and those available under the trade name Dicstyrene from DIC Corporation.

Component (III) has a material hardness on the Shore D hardness scale which, to increase the spin rate on approach shots, is 30 or less, preferably 28 or less, and more preferably 26 or less. The lower limit is preferably at least 18, and more preferably at least 20.

Component (III) has a rebound resilience which, to maintain the spin rate of the ball on approach shots and keep the ball rebound on approach shots low so as achieve good controllability, is not more than 30%, preferably not more than 25%, and more preferably not more than 22%. By thus keeping the rebound resilience very low, a small amount of addition will not have an adverse effect on the golf ball properties, enabling a decrease in the ball initial velocity on approach shots to be achieved. To minimize the decrease in rebound and the reduction in distance on shots with a driver, the lower limit of the rebound resilience is preferably at least 15%, and more preferably at least 20%. This rebound resilience is measured in accordance with JIS-K 6255:2013.

The content of component (III) per 100 parts by weight of component (I) is preferably 30 parts by weight or less, more preferably 15 parts by weight or less, and even more preferably 10 parts by weight or less. The lower limit in this content is preferably at least 0.1 part by weight, more preferably at least 0.2 part by weight, and even more preferably at least 0.5 part by weight. When the content of component (III) is too high, the scuff resistance and moldability may worsen. On the other hand, when the content of component (III) is too low, the low hardness and the desired rebound resilience as a cover resin material may not be obtained, and the ball initial velocity-lowering effect on approach shots may diminish.

In addition to the above resin components, other resin materials may be included in the resin composition containing components (I) to (III). The purposes for doing so are, for example, to further improve the flowability of the golf ball resin composition and to enhance such ball properties as the rebound and the durability to cracking.

Specific examples of other resin materials that may be used include polyamide elastomers, ionomer resins, ethylene-ethylene/butylene-ethylene block copolymers and modified forms thereof, polyacetals, polyethylenes, nylon resins, methacrylic resins, polyvinyl chlorides, polycarbonates, polyphenylene ethers, polyarylates, polysulfones, polyethersulfones, polyetherimides and polyamideimides. These may be used singly or two or more may be used together.

In addition, an active isocyanate compound may be included in the above resin composition. This active isocyanate compound reacts with the polyurethane or polyurea serving as the base resin, enabling the scuff resistance of the overall resin composition to be further enhanced. Moreover, the isocyanate has a plasticizing effect which increases the flowability of the resin composition, enabling the moldability to be improved.

Any isocyanate compound employed in ordinary polyurethanes may be used without particular limitation as the above isocyanate compound. For example, aromatic isocyanate compounds that may be used include 2,4-toluene diisocyanate, 2,6-toluene diisocyanate and mixtures of both, 4,4-diphenylmethane diisocyanate, m-phenylene diisocyanate and 4,4'-biphenyl diisocyanate. Use can also be made of the hydrogenated forms of these aromatic isocyanate compounds, such as dicyclohexylmethane diisocyanate. Other isocyanate compounds that may be used include aliphatic diisocyanates such as tetramethylene diisocyanate, hexamethylene diisocyanate (HDI) and octamethylene diisocyanate; and alicyclic diisocyanates such as xylene diisocyanate. Further examples of isocyanate compounds that may be used include blocked isocyanate compounds obtained by reacting the isocyanate groups on a compound having two or more isocyanate groups on the ends with a compound having active hydrogens, and uretdiones obtained by the dimerization of isocyanate.

The amount of the above isocyanate compounds included per 100 parts by weight of the polyurethane or polyurea serving as component (I) is preferably at least 0.1 part by weight, and more preferably at least 0.5 part by weight. The upper limit is preferably not more than 30 parts by weight, and more preferably not more than 20 parts by weight. When too little is included, a sufficient crosslinking reaction may not be obtained and an improvement in the properties may not be observable. On the other hand, when too much is included, discoloration over time due to heat and ultraviolet light may increase, or problems such as a loss of thermoplasticity or a decline in resilience may arise.

The resin composition may be prepared by mixing together the ingredients using any of various types of mixers, such as a kneading-type single-screw or twin-screw extruder, a Banbury mixer, a kneader or a Labo Plastomill. Alternatively, the ingredients may be mixed together by dry blending at the time that the resin composition is to be injection-molded. In addition, when an active isocyanate compound is used, it may be incorporated at the time of resin mixture using various types of mixers, or a resin masterbatch already containing the active isocyanate compound and other ingredients may be separately prepared and the various components mixed together by dry blending at the time that the resin composition is to be injection molded.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The manufacture of golf balls in which the above-described core, intermediate layer and cover (outermost layer) are formed as successive layers may be carried out in the usual manner, such as by a known injection molding process. For example, a golf ball can be produced by injection-molding the intermediate layer material over the core in an injection mold so as to obtain an intermediate layer-encased sphere, and then injection-molding the material for the cover serving as the outermost layer over the intermediate layer-encased sphere. Alternatively, the encasing layers may each be formed by enclosing the sphere to be encased within two pre-molded hemispherical half-cups and then molding under applied heat and pressure.

The golf ball has a deflection when compressed under a final load of 1,275 N (130 kgf) from an initial load of 98 N (10 kgf) which is preferably at least 2.0 mm, more preferably at least 2.2 mm, and even more preferably at least 2.3 mm. The upper limit value is preferably not more than 3.7 mm, more preferably not more than 3.5 mm, and even more preferably not more than 3.4 mm. When the golf ball deflection is too small, i.e., when the ball is too hard, the spin rate may rise excessively and a good distance may not be achieved or the feel at impact may be too hard. On the other hand, when the deflection is too large, i.e., when the ball is too soft, the durability to cracking on repeated impact may worsen or the initial velocity on shots may be low, as a result of which a good distance may not be achieved on shots with a driver (W#1).

Numerous dimples may be formed on the outside surface of the cover. The number of dimples arranged on the cover surface, although not particularly limited, is preferably at least 323, more preferably at least 326, and even more preferably at least 330. The upper limit is preferably not more than 380, more preferably not more than 360, and even more preferably not more than 350. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of the dimple, as a percentage of the spherical surface area of the ball were the ball to have no dimples thereon, to be set to at least 70% and not more than 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may fail to travel a fully satisfactory distance.

A coating layer is formed on the surface of the cover. This coating layer can be formed by applying various types of coating materials. Because the coating layer must be capable of enduring the harsh conditions of golf ball use, it is desirable to use a coating composition in which the chief component is a urethane coating material composed of a polyol and a polyisocyanate.

The polyol component is exemplified by acrylic polyols and polyester polyols. These polyols include modified polyols. To further increase workability, other polyols may also be added.

The acrylic polyol is exemplified by homopolymers and copolymers of monomers having functional groups that react with isocyanate. Such monomers are exemplified by alkyl esters of (meth)acrylic acid, specific examples of which include methyl (meth)acrylate, ethyl (meth)acrylate, isopropyl (meth)acrylate, butyl (meth)acrylate, isobutyl (meth)acrylate, 2-ethylhexyl (meth)acrylate, lauryl (meth)acrylate, stearyl (meth)acrylate, cyclohexyl (meth)acrylate, isobornyl (meth)acrylate, 2-hydroxyethyl (meth)acrylate, 2-hydroxypropyl (meth)acrylate and 4-hydroxybutyl (meth)acrylate. These may be used singly or two or more may be used together.

Modified acrylic polyols that may be used include polyester-modified acrylic polyols. Examples of other polyols include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PH2A); lactone-type polyester polyols such as poly-ε-caprolactone (PCL); and polycarbonate polyols such as polyhexamethylene carbonate. These may be used singly or two or more may be used together. The ratio of these polyols to the total amount of acrylic polyol is preferably not more than 50 wt %, and more preferably not more than 40 wt %.

Polyester polyols are obtained by the polycondensation of a polyol with a polybasic acid. Examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol; and also triols, tetraols, and polyols having an alicyclic structure. Examples of the polybasic acid include aliphatic dicarboxylic acids such as succinic acid, adipic acid, sebacic acid, azelaic acid and dimer acid; aliphatic unsaturated dicarboxylic acids such as fumaric acid, maleic acid, itaconic acid and citraconic acid; aromatic polycarboxylic acids such as phthalic acid, isophthalic acid, terephthalic acid, trimellitic acid and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid and endomethylene tetrahydrophthalic acid; and tris-2-carboxyethyl isocyanurate.

It is suitable to use two types of polyester polyol together as the polyol component. Letting the two types of polyester polyol be component A and component B, a polyester polyol in which a cyclic structure has been introduced onto the resin skeleton may be used as the polyester polyol of component A. Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a multibranched structure may be used as the polyester polyol of component B. Examples include polyester polyols having a branched structure, such as NIPPOLAN 800 from Tosoh Corporation.

The weight-average molecular weight (Mw) of the overall base resin consisting of the above two types of polyester polyol is preferably from 13,000 to 23,000, and more preferably from 15,000 to 22,000. The number-average molecular weight (Mn) of the overall base resin consisting of these two types of polyester polyols is preferably from 1,100 to 2,000, and more preferably from 1,300 to 1,850. Outside of these ranges in the average molecular weights (Mw and Mn), the wear resistance of the coating layer may decrease. The weight-average molecular weight (Mw) and the number-average molecular weight (Mn) are polystyrene-equivalent measured values obtained by gel permeation chromatography (GPC) using differential refractometry.

The contents of these two types of polyester polyol (components A and B) are not particularly limited, although the content of component A is preferably from 20 to 30 wt % of the total amount of the base resin and the content of component B is preferably from 2 to 18 wt % of the total amount of the base resin.

The polyisocyanate is exemplified, without particular limitation, by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Modified forms of hexamethylene diisocyanate include, for example, polyester-modified hexamethylene diisocyanate and urethane-modified hexamethylene diisocyanate. Derivatives of hexamethylene diisocyanate include isocyanurates, biurets and adducts of hexamethylene diisocyanate.

The molar ratio of isocyanate (NCO) groups on the polyisocyanate to hydroxyl (OH) groups on the polyol, expressed as NCO/OH, is preferably in the range of 0.5 to 1.5, more preferably from 0.8 to 1.2, and even more preferably from 1.0 to 1.2. At less than 0.5, unreacted hydroxyl groups remain, which may adversely affect the performance and water resistance of the coating layer. On the other hand, at above 1.5, the number of isocyanate groups becomes excessive and urea groups (which are fragile) form in reactions with moisture, as a result of which the performance of the coating layer may decline.

An amine catalyst or an organometallic catalyst may be used as the curing catalyst (organometallic compound). Examples of the organometallic compound include soaps of metals such as aluminum, nickel, zinc or tin. Preferred use can be made of such compounds which have hitherto been included as curing agents for two-part curing urethane coatings.

Depending on the coating conditions, various types of organic solvents may be mixed into the coating composition. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

Known coating ingredients may be optionally added to the coating composition. For example, thickeners, ultraviolet absorbers, fluorescent brighteners, slip agents and pigments may be included in suitable amounts.

The thickness of the coating layer made of the coating composition, although not particularly limited, is typically from 5 to 40 μm, and preferably from 10 to 20 μm. As used herein, "coating layer thickness" refers not to the coating layer formed within the dimples, but to the thickness of the coating formed on the ball surface outside of the dimples (also referred to as the "lands").

In this invention, the coating layer made of the above coating composition has an elastic work recovery that is preferably at least 60%, more preferably at least 70%, and even more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton ($\mu N$) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, and so it is thought that the physical properties of the coating layer can be precisely evaluated. Given that the coating layer on the ball surface is strongly affected by the impact of the driver and various other types of clubs and has a not inconsiderable influence on the golf ball properties, measuring the coating layer by the nanohardness test method and carrying out such measurement to a higher precision than in the past is a very effective method of evaluation.

The hardness of the coating layer, as expressed on the Shore M hardness scale, is preferably at least 40, and more preferably at least 60. The upper limit is preferably not more than 95, and more preferably not more than 85. This Shore M hardness is obtained in accordance with ASTM D2240. The hardness of the coating layer, as expressed on the Shore C hardness scale, is preferably at least 40 and has an upper limit of preferably not more than 80. This Shore C hardness is obtained in accordance with ASTM D2240. At coating layer hardnesses that are higher than these ranges, the coating may become brittle when the ball is repeatedly struck, which may make it incapable of protecting the cover layer. On the other hand, coating layer hardnesses that are lower than the above range are undesirable because the ball surface may be more easily damaged when striking a hard object and mud may stick more readily to the ball.

When the above coating composition is used, the formation of a coating layer on the surface of golf balls manufactured by a known method can be carried out via the steps of preparing the coating composition at the time of application, applying the composition onto the golf ball surface by a conventional coating operation, and drying the applied composition. The coating method is not particularly limited. For example, spray painting, electrostatic painting or dipping may be suitably used.

EXAMPLES

The following Examples and Comparative Examples are provided to illustrate the invention, and are not intended to limit the scope thereof.

Examples 1 to 5, Comparative Examples 1 and 2

Formation of Core

Solid cores were produced by preparing rubber compositions for Examples 1 to 4 and Comparative Examples 1 and 2 shown in Table 1 and then vulcanizing the compositions under the temperature and time conditions shown in the same table.

In Example 5, which is a prospective example, a solid core is produced in the same way as above using the composition and vulcanization conditions shown in Table 1.

TABLE 1

| Rubber formulation | | Example | | | | | Comparative Example | |
|---|---|---|---|---|---|---|---|---|
| | (pbw) | 1 | 2 | 3 | 4 | 5 | 1 | 2 |
| (a) | Polybutadiene A | | | | | | 100 | |
| | Polybutadiene B | 100 | 100 | 100 | 100 | 100 | | |
| | Polybutadiene C | | | | | | | 100 |
| (c) | Organic peroxide | 1.0 | 1.0 | 1.0 | 1.0 | 1.0 | 1.0 | 0.6 |
| — | Antioxidant (1) | | | | | | 0.1 | 0.1 |
| (f) | Antioxidant (2) | 0.3 | 0.3 | 0.3 | 0.3 | 0.3 | | |
| — | Zinc oxide | 17.9 | 19.8 | 18.6 | 21.8 | 15.2 | 17.2 | 17.6 |
| (b) | Zinc acrylate | 32.0 | 27.5 | 34.8 | 27.5 | 38.0 | 33.0 | 37.5 |
| — | Zinc stearate | 2 | 2 | 2 | 2 | 2 | | |
| (e) | Sulfur | 0.038 | 0.013 | 0.038 | 0.013 | 0.090 | | |
| (d) | Water | 0.2 | 0.2 | 0.6 | 0.6 | 0.2 | 0.4 | 0.8 |
| — | Zinc salt of pentachlorothiophenol | 0.1 | 0.1 | 0.6 | 0.3 | 1.3 | 0.4 | 1.0 |
| | Vulcanization temperature (° C.) | 148 | 148 | 158 | 158 | 148 | 148 | 158 |
| | Vulcanization time (minutes) | 19 | 19 | 14 | 14 | 19 | 19 | 14 |

Details on the ingredients mentioned in Table 1 are given below.
Polybutadiene A: Available under the trade name "BR 01" from JSR Corporation
Polybutadiene B: Available under the trade name "T0700" from JSR Corporation
Polybutadiene C: Available under the trade name "BR 730" from JSR Corporation
Organic Peroxide: Dicumyl peroxide, available under the trade name "Percumyl D" from NOF Corporation
Antioxidant (1): 2,2'-Methylenebis(4-methyl-6-butylphenol), available under the trade name "Nocrac NS-6" from Ouchi Shinko Chemical Industry Co., Ltd.
Antioxidant (2): 2-Mercaptobenzimidazole, available under the trade name "Nocrac MB" from Ouchi Shinko Chemical Industry Co., Ltd.
Zinc oxide: Available as "Grade 3 Zinc Oxide" from Sakai Chemical Co., Ltd.
Zinc acrylate: "ZN-DA85S" from Nippon Shokubai Co., Ltd.
Zinc stearate: Available under the trade name "Zinc Stearate G" from NOF Corporation
Sulfur: Sulfur masterbatch containing 80 wt % of powder sulfur for rubber, available under the trade name Sanmix S-80N from Sanshin Chemical Industry Col., Ltd.
Water: Pure water (from Seiki Chemical Industrial Co., Ltd.)
Zinc salt of pentachlorothiophenol: Available from Wako Pure Chemical Industries, Ltd.

Formation of Intermediate Layer and Cover (Outermost Layer)

Next, in Examples 1 to 4 and Comparative Examples 1 and 2, an intermediate layer was formed by injection-molding Intermediate Layer Materials No. 3 to No. 5 formulated as shown in Table 2 over the core obtained above, thereby producing an intermediate layer-encased sphere. A cover (outermost layer) was then formed by injection-molding Cover Material No. 1 or No. 2 formulated as shown in the same table over the resulting intermediate layer-encased sphere, thereby producing the golf ball. Dimple Configuration I (330 dimples) or Dimple Configuration II (338 dimples) shown below was formed at this time on the cover surface.

In Example 5, a golf ball is produced in the same way as above by injection-molding intermediate layer material No. 3 and cover material No. 1 formulated as shown in Table 2. At this time, Dimple Configuration I shown below is formed on the cover surface.

TABLE 2

| Resin material (pbw) | No. 1 | No. 2 | No. 3 | No. 4 | No. 5 |
|---|---|---|---|---|---|
| Himilan ® 1706 | | | 15 | | 35 |
| Himilan ® 1557 | | | | 15 | 15 |
| Himilan ® 1605 | | | | | 50 |
| Himilan ® 7318 | | | 85 | 85 | |
| TPU1 | 100 | | | | |
| TPU2 | | 100 | | | |
| Polyester Elastomer 1 | | | 14.5 | 0.5 | |
| Polyester Elastomer 2 | | | | 14.5 | |
| SEBS | | | 5 | 0.5 | |

Trade names for the materials in the above table are given below.
Himilan ® 1706: An ionomer available from Dow-Mitsui Polychemicals Co., Ltd.
Himilan ® 1557: An ionomer available from Dow-Mitsui Polychemicals Co., Ltd.
Himilan ® 1605: An ionomer available from Dow-Mitsui Polychemicals Co., Ltd.
Himilan ® 7318: An ionomer available from Dow-Mitsui Polychemicals Co., Ltd.
TPU1: An ether-type thermoplastic polyurethane available as Pandex ® from DIC Covestro Polymer, rebound resilience, 54%
TPU2: An ether-type thermoplastic polyurethane available as Pandex ® from DIC Covestro Polymer, Ltd.; Shore D hardness, 43; rebound resilience, 61%
Polyester Elastomer 1: A thermoplastic polyether ester elastomer available under the trade name Hytrel 2401 from DuPont-Toray Co., Ltd.; Shore D hardness, 40; rebound resilience, 67%; melt viscosity, 5,700 dPa · s
Polyester Elastomer 2: A thermoplastic polyether ester elastomer available under the trade name Hytrel 4001 from DuPont-Toray Co., Ltd.; Shore D hardness, 40; rebound resilience, 73%; melt viscosity, 12,800 dPa · s
SEBS: A hydrogenated aromatic vinyl elastomer available under the trade name S.O.E. S1611 from Asahi Kasei Corporation; styrene content, 60 wt %; Shore D hardness, 23; rebound resilience, 20%

The rebound resilience values were measured based on JIS-K 6255:2013. The melt viscosity values were measured with a Capilograph at a temperature of 200° C. and a shear rate of 243 $s^{-1}$ in accordance with ISO 11443:1995.

Figure 2A:
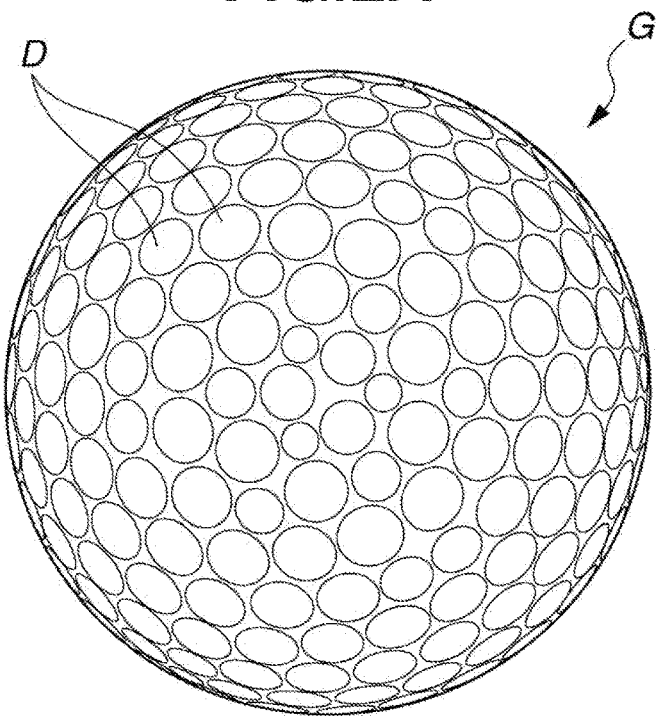
FIG. 2A is a plan view and FIG. 2B is a side view showing the Dimple Configuration I pattern common to Examples 1, 2 and 5 and Comparative Example 1.
Figure 2B:
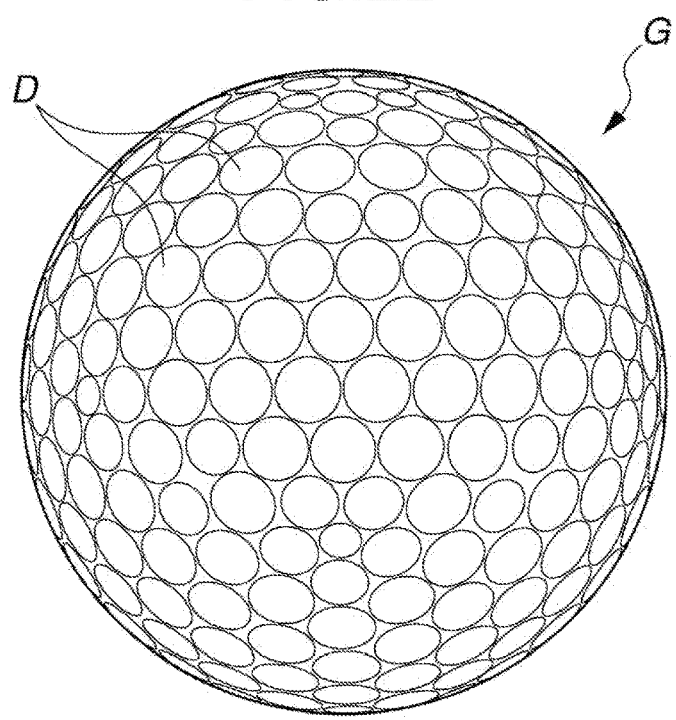

Dimple Configuration I uses eight varieties of circular dimples. The details are shown in Table 3 below. The dimples are arranged as shown in FIG. 2. FIG. 2A is a top view of the dimples and FIG. 2B is a side view of the dimples.

TABLE 3

| Dimple Configuration I | Number | Diameter (mm) | Depth (mm) | Volume (mm³) | Cylinder volume ratio | SR (%) | VR (%) |
|---|---|---|---|---|---|---|---|
| I-1 | 12 | 4.6 | 0.123 | 1.116 | 0.546 | 82.30 | 0.775 |
| I-2 | 198 | 4.45 | 0.122 | 1.036 | 0.546 | | |
| I-3 | 36 | 3.85 | 0.119 | 0.757 | 0.546 | | |
| I-4 | 12 | 2.75 | 0.090 | 0.288 | 0.539 | | |
| I-5 | 36 | 4.45 | 0.136 | 1.120 | 0.530 | | |
| I-6 | 24 | 3.85 | 0.133 | 0.820 | 0.530 | | |
| I-7 | 6 | 3.4 | 0.118 | 0.563 | 0.526 | | |
| I-8 | 6 | 3.3 | 0.118 | 0.530 | 0.525 | | |
| Total | 330 | | | | | | |

Figure 3A:
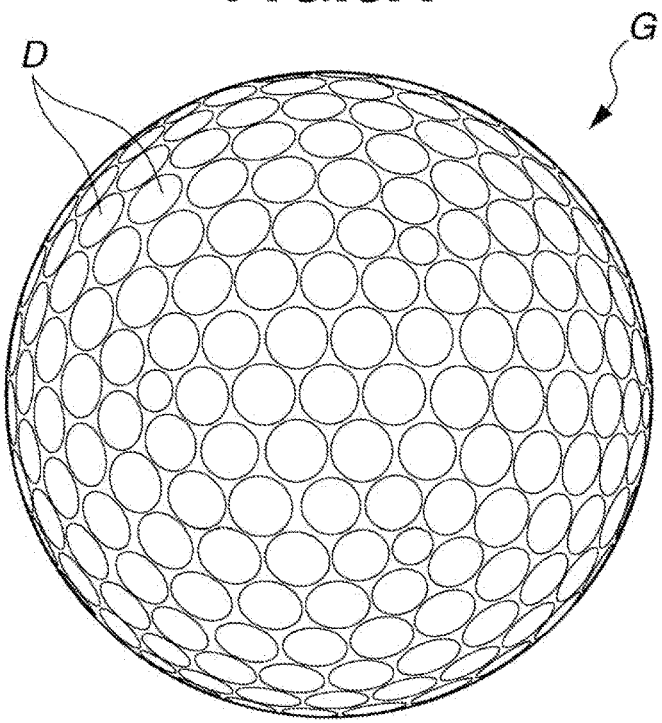
FIG. 3A is a plan view and FIG. 3B is a side view showing the Dimple Configuration II pattern common to Examples 3 and 4 and Comparative Example 2.
Figure 3B:
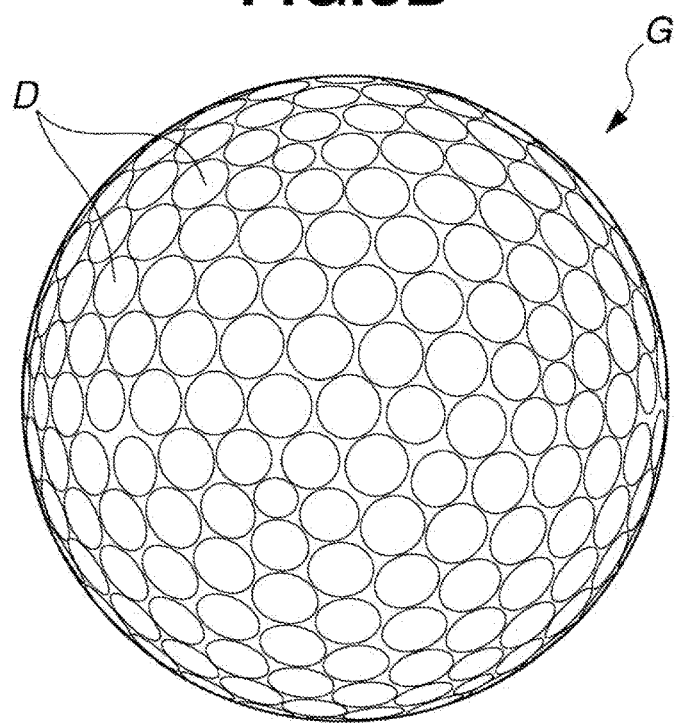

Dimple Configuration II uses six varieties of circular dimples. The details are shown in Table 4 below. The dimples are arranged as shown in FIG. 3. FIG. 3A is a top view of the dimples and FIG. 3B is a side view of the dimples.

TABLE 4

| Dimple Configuration II | Number | Diameter (mm) | Depth (mm) | Volume (mm³) | Cylinder volume ratio | SR (%) | VR (%) |
|---|---|---|---|---|---|---|---|
| II-1 | 204 | 4.4 | 0.136 | 1.013 | 0.490 | 82.75 | 0.774 |
| II-2 | 48 | 3.9 | 0.135 | 0.790 | 0.490 | | |
| II-3 | 12 | 2.9 | 0.100 | 0.324 | 0.490 | | |
| II-4 | 36 | 4.3 | 0.144 | 1.024 | 0.490 | | |
| II-5 | 24 | 3.9 | 0.143 | 0.837 | 0.490 | | |
| II-6 | 14 | 4.0 | 0.120 | 0.739 | 0.490 | | |
| Total | 338 | | | | | | |

Dimple Definitions

Edge: Highest place in cross-section passing through center of dimple.

Diameter: Diameter of flat plane circumscribed by edge of dimple.

Depth: Maximum depth of dimple from flat plane circumscribed by edge of dimple.

SR: Sum of individual dimple surface areas, each defined by flat plane circumscribed by edge of dimple, as a percentage of spherical surface area of ball were it to have no dimples thereon.

Dimple volume: Dimple volume below flat plane circumscribed by edge of dimple.

Cylinder volume ratio: Ratio of dimple volume to volume of cylinder having same diameter and depth as dimple.

VR: Sum of volumes of individual dimples formed below flat plane circumscribed by edge of dimple, as a percentage of volume of ball sphere were it to have no dimples thereon.

Formation of Coating Layer

Next, in Examples 1 to 4 and Comparative Examples 1 and 2, the coating composition shown in Table 5 below, which is common to all the Examples and Comparative Examples, was applied with an air spray gun onto the surface of the cover (outermost layer) having numerous dimples formed thereon, producing golf balls with a 15 µm thick coating layer on top.

The above coating is applied in the same way in Example 5, producing a golf ball with a 15 µm thick coating layer on top.

TABLE 5

| Coating composition (pbw) | Base resin | Polyester polyol (A) | 23 |
|---|---|---|---|
| | | Polyester polyol (B) | 15 |
| | | Organic solvent | 62 |
| | Curing agent | Isocyanate (HMDI isocyanurate) | 42 |
| | | Solvent | 58 |
| | Molar blending ratio (NCO/OH) | | 0.89 |
| Properties of coat | Elastic work recovery (%) | | 84 |
| | Shore M hardness | | 84 |
| | Shore C hardness | | 63 |
| | Thickness (µm) | | 15 |

Synthesis of Polyester Polyol (A)

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the reaction was effected by raising the temperature to between 200 and 240° C. under stirring and heating for 5 hours. This yielded Polyester Polyol (A) having an acid value of 4, a hydroxyl value of 170 and a weight-average molecular weight (Mw) of 28,000.

Next, the Polyester Polyol (A) thus synthesized was dissolved in butyl acetate, thereby preparing a varnish having a nonvolatiles content of 70 wt %.

The base resin for the coating composition in Table 5 was prepared by mixing together 23 parts by weight of the above polyester polyol solution, 15 parts by weight of Polyester Polyol (B) (the saturated aliphatic polyester polyol NIPPOLAN 800 from Tosoh Corporation; weight-average molecular weight (Mw), 1,000; 100% solids) and an organic solvent. This mixture had a nonvolatiles content of 38.0 wt %.

Elastic Work Recovery

The elastic work recovery of the coating material is measured using a coating sheet having a thickness of 50 µm. The ENT-2100 nanohardness tester from Erionix Inc. is used as the measurement apparatus, and the measurement conditions are as follows.

Indenter: Berkovich indenter (material: diamond; angle α: 65.03°)
Load F: 0.2 mN
Loading time: 10 seconds
Holding time: 1 second
Unloading time: 10 seconds The elastic work recovery is calculated as follows, based on the indentation work $W_{elast}$ (Nm) due to spring-back deformation of the coating and on the mechanical indentation work $W_{total}$ (Nm).

$$\text{Elastic work recovery} = W_{elast}/W_{total} \times 100 (\%)$$

Shore C Hardness and Shore M Hardness

The Shore C hardness and Shore M hardness in Table 5 above are determined by forming the material to be tested into 2 mm thick sheets and stacking three such sheets together to give a test specimen. Measurements are taken using a Shore C durometer and a Shore M durometer in accordance with ASTM D2240.

Various properties of the resulting golf balls, including the internal hardnesses of the core at various positions, the diameters of the core and each layer-encased sphere, the thickness and material hardness of each layer, and the surface hardness of each layer-encased sphere, are evaluated by the following methods. The results are presented in Table 6.

Diameters of Core and Intermediate Layer-Encased Sphere

The spheres to be measured are held isothermally for at least 3 hours in a thermostatic chamber adjusted to 23.9±1° C., following which they are measured in a 23.9±2° C. room. The diameters at five random places on the surface of each sphere are measured and, using the average of these measurements as the measured value for a single sphere, the average diameter for ten such spheres is determined.

Ball Diameter

The balls to be measured are held isothermally for at least 3 hours in a thermostatic chamber adjusted to 23.9±1° C., following which they are measured in a 23.9±2° C. room. The diameters at 15 random dimple-free areas are measured and, using the average of these measurements as the measured value for a single ball, the average diameter for ten balls is determined.

Deflections of Core. Intermediate Layer-Encased Sphere and Ball

The core, intermediate layer-encased sphere or ball is placed on a hard plate and the amount of deflection when compressed under a final load of 1,275 N (130 kgf) from an initial load of 98 N (10 kgf) is measured. The amount of deflection is the measured value obtained after temperature conditioning the specimen at 23.9° C. The rate at which pressure is applied by the head which compresses the specimen is set to 10 mm/s.

Core Hardness Profile

The indenter of a durometer is set substantially perpendicular to the spherical surface of the core and the surface hardness on the JIS-C hardness scale is measured in accordance with JIS K6301-1975. The hardnesses at the center and specific positions of the core are measured as JIS-C hardness values by perpendicularly pressing the indenter of a durometer against the center portion and the specific positions shown in Table 6 on the flat cross-section obtained by cutting the core into hemispheres. The P2 Automatic Rubber Hardness Tester (Kobunshi Keiki Co., Ltd.) equipped with a JIS-C durometer can be used for measuring the hardness. The maximum value is read off as the hardness value. Measurements are all carried out in a 23±2° C. environment.

Material Hardnesses of Intermediate Layer and Cover

The resin material for each layer is molded into a sheet having a thickness of 2 mm and left to stand for at least two weeks. The Shore D hardness of each material is then measured in accordance with ASTM D2240. The P2 Automatic Rubber Hardness Tester (Kobunshi Keiki Co., Ltd.) is used for measuring the hardness. A Shore D hardness attachment is mounted on the tester and the hardness is measured. The maximum value is read off as the hardness value. All measurements are carried out in a 23±2° C. environment.

Good: Total distance is at least 228 m, but less than 230 m

NG: Total distance is less than 228 mm

Evaluation of Flight (I#6)

A middle iron (I#6) is mounted on a golf swing robot and the initial velocity, spin rate and distance of the ball when struck at a head speed of 43.5 m/s are measured. The club used is the JGR Forged (2016 model) manufactured by Bridgestone Sports Co., Ltd. The initial velocity and spin rate of the ball immediately after being similarly struck are measured with a launch monitor. The flight performance is evaluated based on the following criteria.

Rating Criteria

Excellent (Exc): Total distance is 180 m or more

TABLE 6

| | | Example | | | | | Comparative Example | |
|---|---|---|---|---|---|---|---|---|
| | | 1 | 2 | 3 | 4 | 5 | 1 | 2 |
| Core | Diameter (mm) | 38.7 | 38.6 | 38.1 | 38.1 | 38.7 | 38.6 | 38.1 |
| | Weight (g) | 35.2 | 35.0 | 33.9 | 33.9 | 35.1 | 35.1 | 33.9 |
| | Deflection (mm) | 3.1 | 3.3 | 4.2 | 4.4 | 3.5 | 3.3 | 4.3 |
| | Ratio of sulfur and water (e)/(d) | 0.190 | 0.065 | 0.063 | 0.022 | 0.450 | 0.000 | 0.000 |
| | Hardness profile H0 | 60 | 63 | 59 | 56 | 52 | 64 | 56 |
| | (JIS-C) H50 | 72 | 70 | 64 | 62 | 67 | 67 | 62 |
| | H70 | 75 | 75 | 69 | 69 | 71 | 77 | 73 |
| | H100 | 90 | 87 | 87 | 82 | 90 | 85 | 81 |
| | H100 − H0 | 30 | 24 | 28 | 26 | 38 | 21 | 25 |
| | H100 − H70 | 15 | 12 | 18 | 13 | 19 | 8 | 8 |
| | HAV | 74 | 73 | 70 | 67 | 70 | 72 | 66 |
| | HAV − H70 | −1 | −2 | 1 | −2 | −1 | −5 | −7 |
| Intermediate layer | Material (Type) | No. 3 | No. 4 | No. 5 | No. 5 | No. 3 | No. 4 | No. 5 |
| | Thickness (mm) | 1.2 | 1.2 | 1.4 | 1.5 | 1.2 | 1.2 | 1.5 |
| | Material hardness (Shore D) | 67 | 66 | 64 | 64 | 67 | 66 | 64 |
| Intermediate layer-encased sphere | Diameter (mm) | 41.1 | 41.0 | 41.0 | 41.0 | 41.1 | 41.0 | 41.1 |
| | Weight (g) | 40.8 | 40.8 | 40.6 | 40.7 | 40.8 | 40.7 | 40.8 |
| | Deflection (mm) | 2.6 | 2.8 | 3.2 | 3.5 | 3.0 | 2.9 | 3.4 |
| Cover | Material (Type) | No. 1 | No. 2 | No. 1 | No. 2 | No. 1 | No. 2 | No. 1 |
| | Thickness (mm) | 0.8 | 0.8 | 0.9 | 0.9 | 0.8 | 0.9 | 0.9 |
| | Material hardness (Shore D) | 47 | 43 | 47 | 43 | 47 | 43 | 47 |
| Dimples | Number of dimples | 330 | 330 | 338 | 338 | 330 | 330 | 338 |
| | (configuration) | (I) | (I) | (II) | (II) | (I) | (I) | (II) |
| Ball | Diameter (mm) | 42.7 | 42.7 | 42.7 | 42.7 | 42.7 | 42.7 | 42.8 |
| | Weight (g) | 45.5 | 45.5 | 45.6 | 45.6 | 45.5 | 45.4 | 45.7 |
| | Deflection (mm) | 2.4 | 2.7 | 3.0 | 3.3 | 2.7 | 2.7 | 3.1 |

The flight of each golf ball on shots with a driver (W#1) and a middle iron (I#6) and the controllability of the ball on approach shots are evaluated by the following methods. The results are shown in Table 7.

Evaluation of Flight (W#1)

A driver (W#1) are mounted on a golf swing robot and the initial velocity, spin rate and total distance of the ball when struck at a head speed (HS) of 45 m/s are each measured. The club used is the Tour B XD-5 Driver (loft angle, 8.5°) manufactured by Bridgestone Sports Co., Ltd. The initial velocity and spin rate of the ball immediately after being similarly struck are measured with a launch monitor. The flight performance is evaluated based on the following criteria.

Rating Criteria

Excellent (Exc): Total distance is 230 m or more

Good: Total distance is at least 175 m, but less than 180 m

NG: Total distance is less than 175 mm

Evaluation of Spin Rate on Approach Shots

A sand wedge is mounted on a golf swing robot and the spin rate of the ball when struck at a head speed of 13.6 m/s is rated according to the criteria shown below. The spin rate of the ball immediately after being similarly struck is measured with a launch monitor. The sand wedge used is the Tour-Stage TW-03 (loft angle, 57°; 2002 model) manufactured by Bridgestone Sports Co., Ltd.

Rating Criteria:

Good: Spin rate is 4,700 rpm or more

NG: Spin rate is less than 4,700 rpm

TABLE 7

|  |  | Example | | | | | Comparative Example | |
|---|---|---|---|---|---|---|---|---|
|  |  | 1 | 2 | 3 | 4 | 5 | 1 | 2 |
| Flight | Initial velocity (m/s) | 67.1 | 66.7 | 66.3 | 66.1 | 67.2 | 66.8 | 66.2 |
| (W#1, HS = 45 m/s) | Spin rate (rpm) | 2,884 | 2,985 | 2,908 | 2,859 | 2,948 | 2,922 | 2,837 |
|  | Total distance (m) | 230 | 230 | 229 | 228 | 228 | 230 | 226 |
|  | Rating | Exc | Exc | good | good | good | Exc | NG |
| Flight | Initial velocity (m/s) | 57.9 | 57.9 | 57.7 | 57.7 | 58.2 | 58.0 | 58.0 |
| (I#6, HS = 43.5 m/s) | Spin rate (rpm) | 5,309 | 5,504 | 4,656 | 4,738 | 4,699 | 5,366 | 4,604 |
|  | Total distance (m) | 176 | 175 | 182 | 181 | 182 | 174 | 182 |
|  | Rating | good | good | Exc | Exc | Exc | NG | Exc |
| Controllability | Spin rate (rpm) | 4,958 | 5,073 | 4,771 | 4,854 | 4,896 | 5,073 | 4,574 |
| on approach shots | Rating | good | good | good | good | good | good | NG |

As demonstrated by the results in Table 7, the golf balls of Comparative Examples 1 and 2 are inferior in the following respects to the golf balls according to the present invention that are obtained in Examples 1 to 5.

In Comparative Example 1, component (e), i.e., sulfur, was not included in the core-forming rubber composition, in addition to which the two formulas specified in this invention for the core hardness profile (HAV−H70≥−4, H100−H70>10) were not satisfied. As a result, the distance traveled by the ball when hit with an iron (I#6) was inferior.

In Comparative Example 2, component (e), i.e., sulfur, was not included in the core-forming rubber composition, in addition to which the two formulas specified in this invention for the core hardness profile (HAV−H70≥−4, H100−H70>10) were not satisfied. As a result, the distance traveled by the ball when hit with a driver (W#1) was inferior and the controllability on approach shots was poor.

Japanese Patent Application No. 2021-177102 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a single-layer core, a cover and at least one intermediate layer interposed between the core and the cover, wherein the core is a material molded under heat from a rubber composition which comprises:
   (a) a base rubber,
   (b) a co-crosslinking agent which is an α, β-unsaturated carboxylic acid or a metal salt thereof or both,
   (c) an organic peroxide,
   (d) water, and
   (e) sulfur
and in which components (d) and (e) have a weight ratio (e)/(d) therebetween that is equal to or more than 0.010; and the core has a hardness profile which satisfies the following conditions:

$HAV-H70 \geq -4$, and $H100-H70 > 10$, where H0 is the JIS-C hardness at a center of the core, H50 is the JIS-C hardness at a point 50% from the core center, H70 is the JIS-C hardness at a point 70% from the core center, H100 is the JIS-C hardness at a surface of the core, and HAV is an average cross-sectional hardness obtained as the average of H0, H50 and H100, and wherein the cover comprises:
   (I) polyurethane or polyurea,
   (II) a thermoplastic polyester elastomer, and
   (III) an aromatic vinyl elastomer,
   components (II) and (III) each being included in respective amounts of 20 parts by weight or less per 100 parts by weight of component (I) in which the amount of component (II) is larger than the amount of component (III), and
wherein the thermoplastic polyester elastomer serving as component (II) has a rebound resilience of from 50 to 72% and a melt viscosity at 200° C. and a shear rate of 243 s$^{-1}$ of $1.0 \times 10^4$ dPa·s or less.

2. The golf ball of claim 1 which satisfies the condition:

$H100-H0 \geq 20$.

3. The golf ball of claim 1, wherein the rubber composition of the core further comprises (f) an antioxidant which is a benzimidazole of the following general formula or a metal salt thereof or both

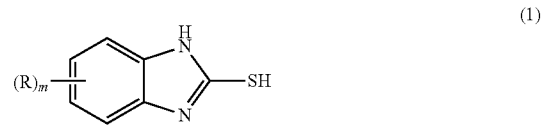

(1)

(wherein R is a hydrogen atom or a hydrocarbon group of 1 to 20 carbon atoms and m is an integer from 1 to 4, with the proviso that if m is 2 or more, each R may be like or unlike).

4. The golf ball of claim 3, wherein component (f) is selected from the group consisting of 2-mercaptobenzimidazole, 2-mercaptomethylbenzimidazole and metal salts thereof.

5. The golf ball of claim 1, wherein the thermoplastic polyester elastomer serving as component (II) has a Shore D hardness of 45 or less, a rebound resilience of 74% or less, and a melt viscosity at 200° C. and a shear rate of 243 s$^{-1}$ of $1.5 \times 10^4$ dPa·s or less.

6. The golf ball of claim 1, wherein the aromatic vinyl elastomer serving as component (III) has a Shore D hardness of 30 or less and a rebound resilience of 30% or less.

7. The golf ball of claim 1, wherein the amount of component (II) included per 100 parts by weight of component (I) is from 5 to 20 parts by weight and the content of component (III) per 100 parts by weight of component (I) is from 0.1 to 5 parts by weight.

* * * * *